# (12) United States Patent
Finn et al.

(10) Patent No.: US 8,108,774 B2
(45) Date of Patent: Jan. 31, 2012

(54) AVATAR APPEARANCE TRANSFORMATION IN A VIRTUAL UNIVERSE

(75) Inventors: Peter G. Finn, Brampton (CA); Rick A. Hamilton, II, Charlottesville, VA (US); Jenny S. Li, Danbury, CT (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 12/238,580

(22) Filed: Sep. 26, 2008

(65) Prior Publication Data
US 2010/0083148 A1    Apr. 1, 2010

(51) Int. Cl.
G06F 15/00 (2006.01)
G06F 13/00 (2006.01)
(52) U.S. Cl. ........................................ 715/706; 715/757
(58) Field of Classification Search .......... 715/763–765, 715/851–853, 706–707, 757–758, 826; 345/419
See application file for complete search history.

(56) References Cited

U.S. PATENT DOCUMENTS

| 5,884,029 | A | 3/1999 | Brush, II et al. |
| 7,073,129 | B1 | 7/2006 | Robarts et al. |
| 7,319,992 | B2 | 1/2008 | Gaos |
| 7,913,176 | B1 * | 3/2011 | Blattner et al. ............... 715/758 |
| 2006/0028475 | A1 * | 2/2006 | Tobias .......................... 345/473 |
| 2007/0233839 | A1 | 10/2007 | Gaos |
| 2008/0309671 | A1 * | 12/2008 | Shuster et al. ............... 345/474 |

FOREIGN PATENT DOCUMENTS
WO    0150387    7/2001
* cited by examiner

*Primary Examiner* — Cao "Kevin" Nguyen
(74) *Attorney, Agent, or Firm* — Patrick J. Daugherty; Driggs, Hogg, Daugherty & Del Zoppo Co., LPA

(57) ABSTRACT

Methods, articles of manufacture, systems, articles and programmable devices are provided for configuring a chameleon avatar in response to data associated with a target avatar within a virtual universe. In response to determining that an engagement of a chameleon avatar with a target avatar is indicated, it is determined whether the chameleon avatar should maintain an initial appearance or be auto-morphed for engagement with the target avatar. Auto-morphing may be accomplished by reading an attribute from metadata associated with the target avatar, selecting a baseline avatar template and auto-morphing the baseline template to incorporate the read attribute. Target avatar attributes include gender, interests, outfits attribute, ethnic data, language and preferences, as well as others. The chameleon may mimic an appearance of the target avatar.

25 Claims, 5 Drawing Sheets

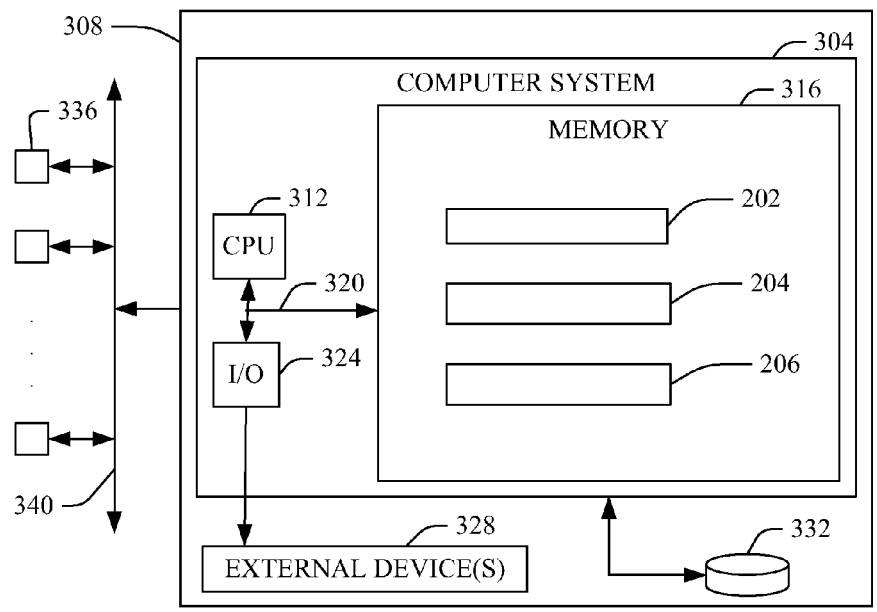

FIG 3

| Height Calculation | Rule | Value | Chameleon avatar deltas |
|---|---|---|---|
| Customer height | set equivalent | 6.2 | 6.2 |
| Range variation | plus/minus .5 | {5.7 to 6.7} | MIN = 5.7, MAX = 6.7 |
| Random number generated | between {-.4 to +.4} | -0.3 | -0.3 |
| Previous experience with this customer | prefers taller | take absolute value of random number | 0.3 |
| Context situation | negotiation | add .1 | 0.1 |

402

| Resulting chameleon avatar height: |
|---|
| = 6.2 + \|-.3\| + .1 |
| = 6.2 + 0.3 + 0.1 |
| = 6.6 |
| Test: Is 6.6 < MAX of 6.7 |
| Yes, so use 6.6 |

AVATAR APPEARANCE TRANSFORMATION IN A VIRTUAL UNIVERSE

FIELD OF THE INVENTION

The present invention generally relates to configuring the perception of an avatar in response to attributes of an engaging avatar, in some examples with duplicative or complimentary attributes.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users through the use of an avatar, a graphical representation of the user often taking the form of a cartoon-like human though any two or three dimensional graphic image or rendering may be utilized. In order to participate within or inhabit a VU, a user creates an agent which functions as the user's account, and upon which the user builds an avatar tied to an inventory of assets the user owns in the VU and associated with the agent.

Many VU's are represented using three dimensional (3-D) graphics and landscapes and are populated by many thousands of users or "residents," wherein the VU often resembles a real world or a fantasy/fictional world in terms of physics, houses, landscapes and in interpersonal communications with other user avatars. VU environments generally comprise a variety of man-made or computer application-generated artifacts, in one aspect representative of items and artifacts understood and recognized by users through their experiences in the real world as well, as through fictional experiences. Real property artifacts may include realistic walkways and streets, buildings (stores, casinos, etc.), parks, plazas, atriums, as well as fantasy environments such as other planets, representations of hell or heaven, or worlds of fictional literature and the arts. Personal property artifacts include a wide variety of items such as real-world motorcycles, tokens, guns, clothing, as well as fantasy world weapons, potions, spacesuits, armor etc. Moreover, avatar artifacts representing users or automated applications (for example, an automaton greeter programmed to request user information inputs) may comprise a wide variety of visual and behavioral attributes, evidencing real-life human-like appearances and behaviors as well as fantastical powers, weapons or character appearances.

Large robust VU's and massively multiplayer online games, such as for example Second Life® (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc. in the United States, other countries, or both), and There™ (THERE is a trademark of Makena Technologies, Inc. in the United States, other countries, or both) render and display detailed, large and complex graphic environments within which users may travel and participate as if a character in an expressionistic or fantastical fictional world or within a realistic or representational approximation of real life.

A VU may also be defined with respect to multiple VU regions, virtual areas of land within the VU often residing on a single server, with each region amenable to provision and management by a one or more participating providers. The size and complexity and variety of resources found in a VU may be directly related to a number of providers participating and hosting regions through server hosting, and the success of a VU may depend upon attracting users and keeping them engaged and participating in the VU environment, thereby adding value to the providers who bear the cost in providing VU region content and services and who may correspondingly expect an appropriate level of multiple-user engagement as a return on their investment, as well as for other users who wish to engage many others in a large virtual community. For example, an informational or service-related region managed by a non-profit organization may desire or expect a given level of VU user engagement and participation, and commercial region providers may desire to engage in a given level of commercial transactions (e.g. number of sales, advertising exposures or paying subscribers) or achieve a level of marketing exposure among VU users.

Customers and other VU residents and users may be less likely to make a purchase from or otherwise engage other avatars with whom they do not feel comfortable. In particular, people new to virtual environments may feel vulnerable or unsure of themselves, and of their perception by other users, and these feelings and perceptions may cause such users to stop participating in a VU.

SUMMARY OF THE INVENTION

Methods are provided for configuring a chameleon avatar in response to data associated with a target avatar within a virtual universe. Methods include determining that an engagement of a chameleon avatar with a target avatar is indicated, the chameleon avatar having an initial appearance configuration, and further determining whether the chameleon avatar should be auto-morphed for engagement with the target avatar. If an auto-morph determining process determines that an auto-morph is appropriate for the indicated engagement, methods comprise reading an attribute from metadata associated with the target avatar, selecting a baseline avatar template as a function of the read attribute and auto-morphing the baseline template to incorporate the read attribute. Chameleon avatars engage target avatars in an initial appearance configuration if an auto-morph determining determines that an auto-morph is not appropriate, or in an auto-morphed baseline template if the auto-morph determining determines that an auto-morph is appropriate.

In another aspect, service methods are provided for configuring a chameleon avatar in response to data associated with a target avatar within a virtual universe environment, more particularly providing a computer infrastructure being operable to perform one or more method and/or process elements as described above and elsewhere herein, for example, by a service provider who offers to implement, deploy, and/or perform functions for others. Still further, articles of manufacture comprising computer usable medium having a computer readable program embodied in said medium may be provided. Such program codes comprise instructions which, when executed on a computer system, cause a computer system to perform one or more methods and/or process elements for configuring a chameleon avatar in response to data associated with a target avatar within a virtual universe, as described above and elsewhere herein. Moreover, systems, articles and programmable devices configured for performing one or more of the method and/or process elements of the present invention, for example as described above and elsewhere herein, are also disclosed.

BRIEF DESCRIPTION OF THE DRAWINGS

These and other features of this invention will be more readily understood from the following detailed description of the various aspects of the invention taken in conjunction with the accompanying drawings in which:

FIG. 3 is a block diagram illustrating an exemplary computerized implementation of a system and method for configuring the perception of an avatar in response to analyzing attributes of an engaging avatar within a VU environment according to the present invention.

FIG. 4 is a tabular illustration of an application of a process and system for configuring the perception of an avatar in response to analyzing attributes of an engaging avatar within a VU environment according to the present invention.

Figure 1:
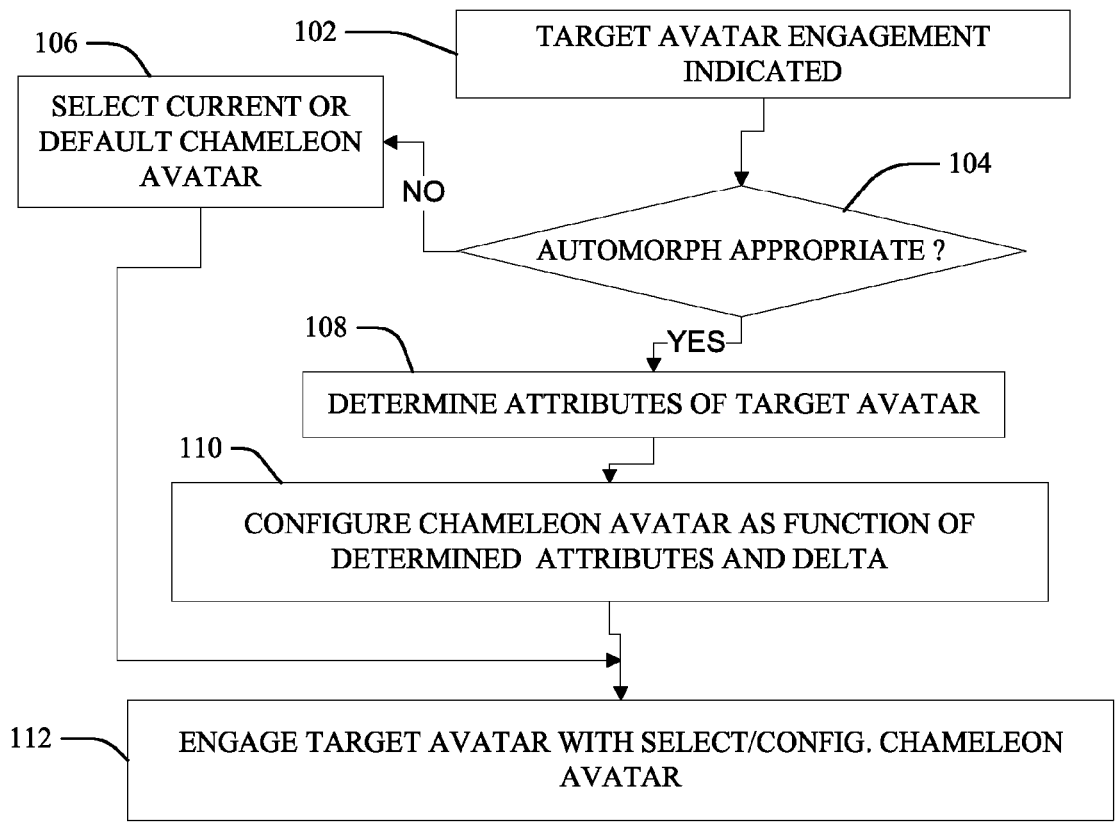
FIG. 1 is a flow chart illustrating a process and system for configuring the perception of an avatar in response to analyzing attributes of an engaging avatar within a virtual universe (VU) environment according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description; and
II. Computerized Implementation.

I. General Description

Referring now to FIG. 1, a method and process for configuring a mutable or chameleon avatar in response to analyzing data and attributes associated with an engaging target avatar within a virtual universe (VU) environment according to the present invention is provided. At 102 the process or system determines that an engagement with the target avatar is indicated, for example the target avatar is approaching the chameleon avatar within a given region in the VU, or the target avatar has requested a meeting with the chameleon avatar through a chat, e-mail, text or other communication means. At 104 it is determined whether the chameleon avatar should be auto-morphed or otherwise altered from its current configuration and appearance into another configuration/appearance more appropriate to engaging the target avatar; if not, a current or default avatar appearance and/or configuration for the chameleon avatar is selected at 106.

Otherwise, if an auto-morph process is appropriate for the current or potential engagement as determined at 104, then at 108 one or more attributes of the engaging target avatar are determined and at 110 the chameleon avatar is auto-morphed into a configuration and/or appearance appropriate for the determined attributes. Auto-morphing may be understood to comprehend automatically changing a chameleon avatar's appearance in response to observed and determined target avatar attributes. Though auto-morphing implies an automatic changing, some embodiments may also provide for manual selection or confirmation inputs into the auto-morphing process, for example prompting a chameleon avatar user for confirmation of a suggested appearance change before implementation, or allowing for a selection from a plurality of suggested or possible appearance changes. Accordingly, at 112 the chameleon avatar engages the target avatar in the auto-morphed or selected/default avatar appearance/configuration.

Figure 2:
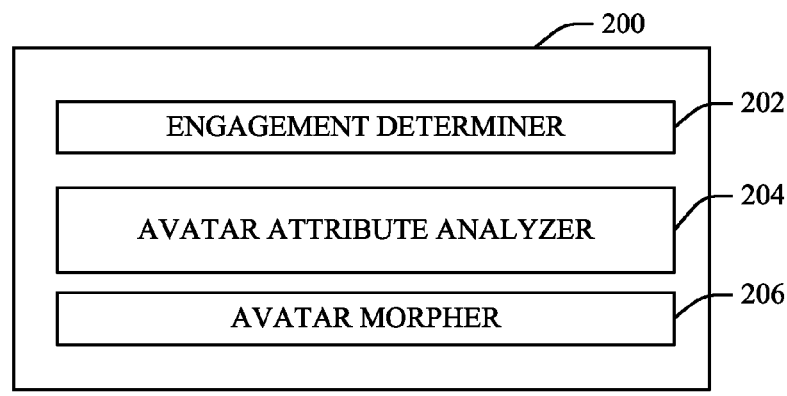
FIG. 2 is a block diagram illustration of a virtual universe client device configured to render an avatar to an engaging avatar/user in response to analyzing attributes of the engaging avatar/user according to the present invention.

FIG. 2 illustrates a logic machine 200 configured to render a chameleon avatar to an engaging target avatar, for example through the process and methods described above with respect FIG. 1. The logic machine 200 comprises an engagement determiner component 202 configured to identify and determine the occurrence or potential occurrence of an engagement of a chameleon avatar with another (target) avatar within a virtual universe domain. An avatar attribute analyzer component 204 is provided and configured to analyze attributes of an engaging target avatar for use in selecting or configuring chameleon avatar outward appearances and other attributes perceived by the engaging target avatar. And avatar morpher/rendering engine component 206 is provided and configured to configure, select and/or render the chameleon avatar to the engaging target avatar as a function of data and processes provided by the avatar attribute analyzer 204.

The present invention thus provides an enhancement to virtual universe environments which enables users, service providers and other virtual universe provider entities to selectively configure the appearances and/or other perceived attributes of an avatar as a function of attributes of another engaging avatar, in one aspect enabling automated customization of an avatar to increase its appeal to another target avatar, for example by reading metadata of a target avatar and customizing a baseline avatar template to create a chameleon avatar believed favorable or acceptable to the target avatar.

More particularly, people often have a natural affinity for, and feel more comfortable dealing with, other people who speak the same language, live within the same geographic region, or have a similar fashion sense, ethnic or cultural identity, hobby or interest, lifestyle preference, etcetera. Such tendencies also translate to avatar engagements in a virtual world, and the present invention provides for encouragement for another (target) avatar to voluntarily engage a mutable or chameleon avatar formed in recognition of target avatar demographics, interests, etc. In one example, service providers are enabled to enhance and provide better, and better-received, services to an engaged avatar by leveraging interpersonal communication tendencies and characteristics to provide automated customization of their representative avatar, in one aspect thereby rendering the chameleon more appealing to another customer/target avatar. Advantages are thus provided in a number of virtual universe engagement contexts, including commercial sales and marketing opportunities, providing appropriate streamed content on demand, providing services responsive to client requirements, requests and needs, and enhancing the experience of a virtual universe resident, thereby encouraging use of the virtual universe domain or one or more regions thereof by the target avatar.

The present invention enables altering the appearance, mannerisms, body language, chat language, accents, and other perceived aspects of a chameleon avatar, for example to improve the chameleon avatar's approachability as perceived by the target avatar and enhancing a business interaction with the target avatar. By reading the outward appearance or metadata of one or more specified target avatars, and in some examples further in conjunction with other available personal data associated with the owner or other user associated with the target avatar(s), the present invention provides methods and systems for modeling a chameleon avatar to increase the comfort level and attractiveness to the target avatar.

In some examples, modeling a chameleon avatar comprises mimicking the appearance and other attributes of a target avatar to create an identical twin chameleon avatar with respect to one or more appearance or other attributes. This approach may be selected as a function of determining that a target avatar user will likely enjoy engaging another avatar exactly like his/her own avatar with respect to one or more appearance or behavior aspect attributes.

However, some target avatar users may not prefer or desire to engage an identical twin chameleon avatar. For example, the ability of the chameleon avatar to access and implement data relevant to the target avatar through mimicking the target avatar may alarm the user of the target avatar, who may interpret this ability as a display of uneven bargaining power through access to superior information in a negotiating or business context; or it may raise privacy concerns with regard to an apparent ability of the user of the chameleon avatar to access personal data about the target user or his or her avatar, which may include personal financial data. Moreover, some users may find dealing with chameleon avatars exhibiting mirror-image characteristics boring, simplistic, cold and automated or even uncomfortable.

Accordingly, in another aspect of the present invention, a chameleon avatar's ability to mimic a target avatar may be turned off. Alternatively, a chameleon avatar may be configured to complement target avatar appearance attributes through revising adopted target avatar attributes through application of difference or delta values. More particularly, a delta value is a value applied to a quantified attribute value in order to produce a revised value, or a value of a different magnitude; for example, a height of a target avatar may be determined to be 6.1 feet tall, and a height delta value may be provided of 0.5, which may be added or subtracted to the observed height value in order to produce a chameleon avatar having a height of 5.6 or 6.6. Delta values may also be factors; for example, an observed value may be revised by multiplication or division with a delta factor of 1.02, resulting in a two-percent increase or decrease of the original value. Still other delta values, applications and settings will be useful according to the present invention and apparent to one skilled in the art. Randomness may also be introduced in delta value settings and applications, for example randomly selecting a height delta value from a provided range of possible values, in one embodiment randomly selecting a height delta value from a range of zero-to-0.5.

In one aspect, incorporating random customizations may make engaging a chameleon avatar more life-like or even entertaining as the behavior and appearances of real people may be unpredictably variable due to changing moods, health and other real-life contexts, a chameleon avatar randomly-revised from an expected configuration, and in particular as revised from encounter to encounter, may seem more life-like, real and interesting relative to a constant and predictable avatar persona or configuration.

Thus, some embodiments may customize a chameleon avatar by reading and applying metadata as revised through delta values to one or more baseline avatar templates specified for or appropriate to a particular target avatar. Customer "likes and preferences" stored in a database associated with the target avatar may be read or retrieved, in some embodiments automatically through proximity detection means. If no appearance attribute metadata is read or retrieved, then a default behavior appropriate to the target avatar, for example a default behavior mimicking, or mimicking plus/minus a delta value, relative to an observed target avatar behavior attribute may be selected.

In another aspect, the present invention enables continuous and unlimited transformations between infinite possible chameleon avatar appearances, for example as selected as a function of a perceived social and business context. Accordingly, automated modification of chameleon avatars may be based on a variety of inputs and parameters, including one or more of engagement context (e.g., social, business or regional context) creation and triggers; deltas applied to observed target or configured chameleon physical characteristics, interests, conversations and mannerisms; modifications of deltas based on randomness and/or real-time customer metadata inputs and revisions; the application of context-sensitive deltas or rules for interaction with multiple customer avatars; and selecting target customer avatars by criteria, and other chameleon avatar modification parameters appropriate for practicing with the methods and systems of the present invention will be apparent to one skilled in the art.

Embodiments of the present invention may utilize a rules engine for automatically creating and customizing reciprocal avatar transformations, in some examples by adding a variable delta value (which may range from zero to any appropriate positive or negative value) to each of a plurality of target avatar attributes to create slight variations, so that the chameleon avatar does not look and act exactly the same as the target avatar. A starting template for the chameleon avatar may be a clone of the target avatar or a standard template selected for the target or an amalgam of multiple avatars, the starting template then modified according to deltas in order to become pleasing to the customer or to attract a target avatar. Embodiments may be both server-side and user-assisted functions, wherein both the chameleon avatar and the target avatar may each see each iteration or image change or adjustment through which the chameleon avatar morphs.

Chameleon avatar characteristics may be determined as a function of selected target avatars or associated users and independent of VU region or event data: for example, if a target customer is wearing a suit, a chameleon avatar outer attire may auto-morph to match (into a suit or other business-like clothing), even if the location is one where no one else is dressed in this way (e.g. a beach). Alternatively, in some embodiments, VU locations or events may cause auto-morphing to be turned on or off or otherwise recognized as input data, thus impacting and recognized in the auto-morph process, for example by attiring the chameleon in some fanciful interpretation of business attire appropriate for the beach (e.g. providing sunglasses, and business-formal attire suitable for a beach setting such as a polo shirt, khakis and fashionable leather sandals). Some embodiments will make auto-morphing decisions based on regional context without altering the morphing choices possible, for example limited to on or off decisions, thus not directly affecting the forming of the appearance or other characteristics of the chameleon avatar.

Chameleon avatar customization may comprise a variety of methods and processes, measuring and recording characteristics of a target avatar(s); querying a database for information on preferences of the target avatar or it's associated user; creating deltas as a function of the characteristics and preferences observations; and creating the engaging chameleon avatar through customizing a base template (for example, a twin or mimic of the target avatar) with one or more attribute deltas, and other processes and method appropriate for practicing within the teachings of the present invention will also be apparent to one skilled in the art.

Examples of characteristics and preferences observations include identifying a target avatar or associated user/owner through one or more available means, such as a review of metadata associated with the target avatar, and target avatar name searching through the VU-specific in general/Internet databases through one or more browser applications. External information available or ascertainable with respect to surrounding avatar(s) may also be relevant with respect to the target avatar or its user/owner; for example, if a target avatar is socializing with the group of avatars engaging in skateboarding, then the chameleon avatar may be responsibly changed to a skateboarding character, or automated skateboarding interactions may be created for the chameleon avatar, with the expectation that the target avatar be more comfortable engaging the chameleon avatar after such an alteration or display. Target avatars may also be directly prompted or queried for information regarding the target avatar's interests (for example, "do you like folk music?").

Boundaries, contexts and triggers may be set or created for transformation of a chameleon avatar. For example, auto-morphing may be limited to presence of a chameleon avatar within the designated boundaries of a retail store or designated business area region within a VU, and further limited to be triggered only by certain specified individuals or groups of targets within such an area. Entrance of a target/customer avatar into a business context may also trigger metadata reading and transformation of chameleon avatar; for example, a car salesman avatar may remain in a default configuration until a potential target/customer avatar approaches the car salesman avatar and initiates an inquiry about purchasing a car.

Thus, different locations may be set to enable (e.g. a chameleon avatar's store, a customer/target avatar A's office, a business partner avatar B's grid) or disable automatic morphing (e.g. a public recreational area, a non-profit organizational setting, or a charity activity setting). A chameleon avatar user or application may predefine a list of target avatars or groups of avatars wherein an engagement would automatically enable an auto-morphing feature, for example listing specific user or avatar names or groups or organizational names. Chameleon avatars may also be configured to exit an auto-morphing state as a function of certain criteria or inputs, for example if no pre-defined target audience is within the user's proximity, or when the chameleon avatar exits a location pre-defined for auto-morphing.

Upon exit from an auto-morphing state, a chameleon avatar may maintain its current state or return to a default or other pre-defined appearance; for example, the chameleon avatar may default to a casual attire look, or to a default configuration selected as a function of a region or location of the chameleon avatar upon exiting the auto-morph state (for example, party clothing if the region is a special or entertainment region, business attire if the region is a workplace, or beach attire if the region is a beach or swimming activity area).

In another aspect, initiation and execution of chameleon avatar processes and methods are highly configurable and may be responsive to a plurality of specific preferences and settings. Thus, a chameleon avatar user may predefine locations and target audiences for auto-morphing feature initiations, as well as threshold distances for enabling data analytic features of target audiences (for example, any target avatar within a default distance or proximity, such as 20 meters defined within the VU environment).

A chameleon avatar application may also be configured to automatically track or detect current locations of target users and trigger auto-morphing when proximate to the target and if the chameleon avatar or the target is within a predefined auto-morphing location. Thus, in one embodiment, if any avatar within a defined proximity of the chameleon avatar user matches a pre-defined target audience list while within an authorized auto-morphing region, data analytics are performed to gather the right information relevant to the detected target avatar and used in configuring how the chameleon avatar should look or act, including the application of any deltas to data obtained through the data analytic processes.

Chameleon avatar physical characteristics, interests, conversations and mannerisms may thus be altered in order to increase perceived attractiveness. Skin tones of the chameleon avatar may be changed to match or complement target avatar skin tones, in some examples adopting skin tones or facial features of a same ethnic group of the target avatar. Chameleon avatar body shape and size may be altered to provide similar height, weight, body type, and apparent age attributes, or deltas may be used for complementary or acceptably or attractively different apparent characteristics. Outer apparel appearances may be changed to project a similar style of clothing. The body language, vocal tones, language, slang and accent of the target avatar may be observed and mirrored by the chameleon avatar, or as changed through application of one or more deltas. In one aspect, the apparent emotions of the target avatar may be observed and either mimicked or an appropriate complementary emotion chosen for engagement; for example, the chameleon avatar may be configured with a pleasant, courteous and patient demeanor for engaging grouchy, rude, withdrawn, reticent or needy target avatars.

Randomization may be introduced in the configuration of the chameleon avatar, in one embodiment changing chameleon avatar appearances and other perceived attributes for each engagement with a target avatar. Delta values may be randomized, and/or the signs thereof, wherein positive-signed deltas adding to attribute values and negative-signed deltas subtract from attribute values. Randomization may render each chameleon avatar iteration unique, and in some instances greatly distinctive from previous iterations. In other examples, different iterations of a chameleon avatar may vary only slightly, wherein each iteration is recognizable as the same chameleon avatar but with some (perhaps not even overtly perceptible) difference. This may provide advantages with respect to target/customer avatars that may prefer not to engage the same chameleon avatar every time, as well as enabling vendors to obscure and avoid revealing that their chameleon avatar is being customized for each target individual if they wish this ability to be held confidential.

Figure 6:
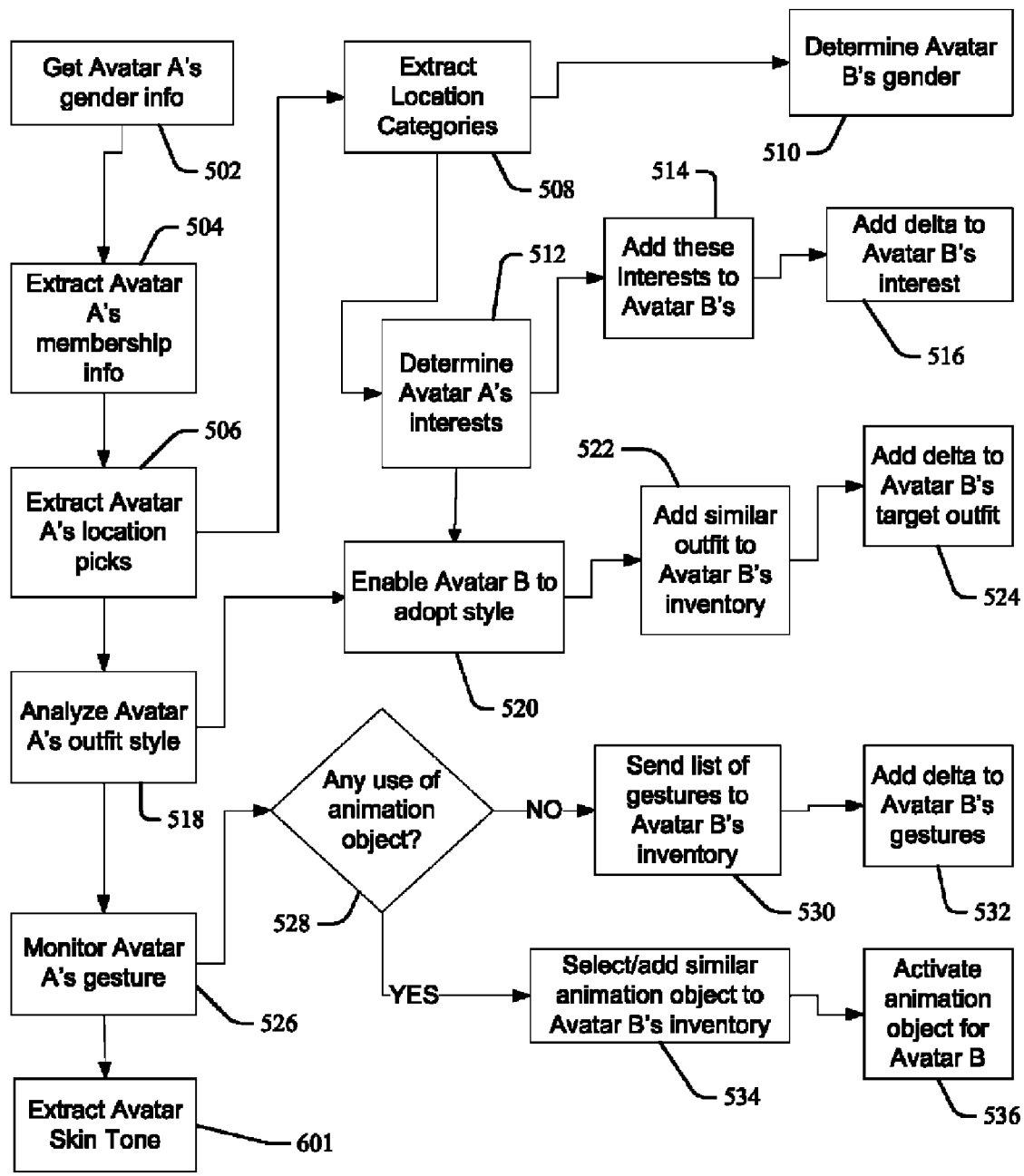
FIG. 6 is a flow chart illustrating an embodiment of a process and system for configuring the perception of an avatar in response to attributes of a target avatar according to the present invention.
Figure 7:
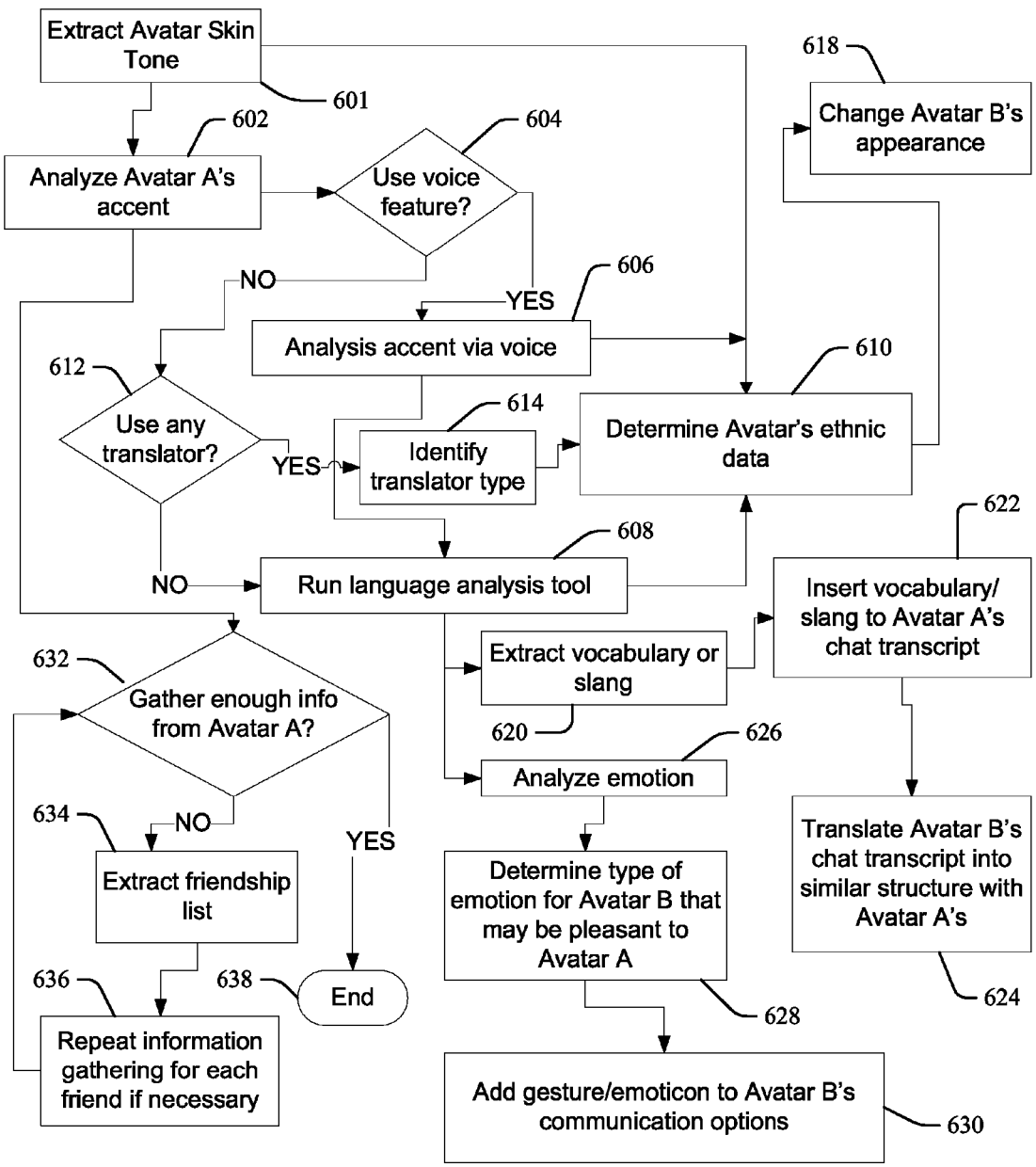
FIG. 7 is a flow chart illustrating additional aspects of the embodiment of FIG. 6.

FIGS. 6 and 7 illustrate a method and process for chameleon avatar configuration in response to analyzing target avatar appearance, behavior and other attribute data, as well as to profiles and other metadata associated with the target avatar. At 502 a chameleon configuration method or application acquires gender or bias information for a target avatar A. Gender information may include the target avatar's gender (for example as determined from reading avatar metadata, and from recognizing unambiguous outward appearances such as anatomical features, clothing, hair style, mannerisms, etc.). Gender preferences for avatar interactions may also be determined or indicated through consideration of organizational membership information extracted at 504, and through extracting the avatar's VU location history and preferences at 506 and further extracting categories of locations from the location data at 508, which in one aspect may be analyzed to determine any correlation with a gender preference orientation: for example, location and membership data associated with a young male target avatar may demonstrate a preference for engaging female avatars within the VU, and thus a female gender configuration may be responsively selected for the chameleon avatar B at 510. In another example membership and location data may indicate a preference for engaging with avatars of the same gender, and thus chameleon avatar B may be configured at 510 with the same gender as that determined for the target avatar A at one or more of 502, 504, 506 and 508.

Data and determinations made at one or more of 502, 504, 506 and 508 may also be used to determine the target avatars interests at 512 (for example, membership in a mountain biking association, or in a political or social organization). Characteristics of items in a target avatar's inventory may also be analyzed at 512, as well as historical tendencies, such as indications that the target avatar is attracted to certain looks or other engaging avatar appearances and attributes, and thus in one aspect a customer profile may be created based on other avatars that the target avatar has previously dealt with and had a positive outcome. Target avatar interests data may thus be identified and incorporated into interest metadata for the chameleon avatar at 514, in one aspect resulting in adding a delta to one or more template interests already provided for the chameleon avatar B at 516.

At 518 the attire and/or appearance styling of the target avatar is determined, and the chameleon avatar is enabled for adopting or mimicking the same appearance or styling at 520, in some examples by adding a similar outfit to the chameleon avatar's inventory at 522. In some embodiments, a target avatar's appearance style as determined at 518 results in adding a delta value to a chameleon avatar's style or clothing configuration or template at 524, for example configuring the chameleon avatar to appear with a style of clothing or outward appearance believed agreeable to an avatar protecting the style of the target avatar A. This may be accomplished by analyzing the look of the target avatar or accessing his/her inventory to find out what he/she is wearing, or prefers to wear.

At 526 the target avatar's gestures are monitored, and observed gestures are listed for addition to the chameleon avatar's inventory of possible gestures at 530, or used with deltas to populate or configure the chameleon avatar's gestures at 532 (for example, adding them to the chameleon avatar's inventory with a delta value difference, or determining a delta value difference to be applied to gestures already populating the chameleon avatar's inventory). In another aspect, monitoring target avatar gestures at 526 also may include noting the use of any animation object by the target avatar at 528, and if so adding corresponding animation objects to the chameleon avatar's inventory at 534, as well as activating animation for one or more animation objects added to the chameleon avatar at 536.

In another aspect, determinations of the target avatar's ethnic data (for example, including race, ethnic group, nationality, and regional identity within a larger nationality or ethnic group) may be determined and used in configuring the chameleon avatar. Thus the skin tone of the target avatar is observed or extracted at 601, and this data may be used to determine other attributes of the target avatar, including providing data determinative of ethnic data at 610.

The target avatar's languages and use and implementation thereof may also be analyzed, identified and utilized. For example, the target avatar's accent or language usage may be observed at 602; if the target avatar is using a voice feature within the virtual universe as determined at 604, then the spoken words of the target avatar may be analyzed for language and accent data at 606 and at 608. Non-voice language and oral communication data (for example, chat and e-mail and text communications) may be analyzed, in a first instance at 612 to determine whether the target avatar is using a translation; if so, the type of translation application is identified at 614, in one aspect to determine an indication of the original input language used by the target avatar user for use in determining the target avatar ethnic data at 610. If no translator use is indicated at 612, a language analysis tool is applied to the non-voice communication data at 608. Acquired data may thus be used to determine ethnic data information associated with the target avatar at 610, which may then be used to change or configure the chameleon avatar at 618. For example, if ethnic data indicates that the target avatar is from the Asian rim, and more particularly of Japanese descent, then the chameleon avatar may be configured as Japanese in ethnicity (skin tone, hair color, facial structures, eye features and coloring etc.), and in appearance and attire appearance at 618.

Analysis of language usage by the target avatar at 608 may also be used in the present embodiment to determine and extract more specific vocabulary or slang usage at 620. For example, vocabulary and slang usage may indicate that the target avatar user/owner is not only American, but it's probably from southern Louisiana as indicated by Creole and other terms and slang usages unique to southern Louisiana. Accordingly, at 622 southern Louisiana vocabulary and slang, or other vocabulary and slang appropriate to that extracted at 620, is added to chat transcripts and other communication configurations and options of the chameleon avatar at 622, and further chameleon avatar translation configurations may be responsively set or altered at 624.

In another aspect, language analysis at 608 as well as other acquired data as described above may be used to determine and analyze representations of emotion by the target avatar at 626. This data may be used in a number of ways, including determining the most appropriate complementary emotional representation or mannerisms for use with the chameleon avatar at 628. For example, chameleon avatar's mannerisms may be set at 628 in response to monitoring and observing the target avatar's use of gestures and chat transcript tone, and in one aspect by recognizing and analyzing the use of a preselected set of emotional keywords appearing in text or voice communications by the target avatar (e.g. "bored", "angry", "whatever", "excited", "happy", "useless", etcetera). In the present embodiment this analysis results in determining that the chameleon avatar should be configured to be pleasant and welcoming to the target avatar at 628, resulting in the addition of one or more gestures and other appropriate communication items such as emoticons and friendly slang to the inventory of possible communication configurations of the chameleon avatar at 630.

At 632 it is determined whether enough information has been gathered, extracted and determined for adequately configuring the chameleon avatar for engaging target avatar, and if so the process ends at 638 with the chameleon avatar configured for engaging the target avatar. However, if additional information is needed, then friendship and colleague data is extracted or determined for the target avatar at 634, for example as identified or determined with regard to membership information at 504 or location information at 506 and 508, as well as other interests as determined at 512 discussed above. This friendship or colleague data may be used to identify other colleague avatars who may provide useful information with regard to the target avatar, wherein one or more of the methods or processes described above and illustrated in FIGS. 6 and 7 infra may be applied to one or more colleague avatars identified at 634, and these processes further repeated at 636 for each colleague/friend as needed until enough information has been gathered as determined at 632.

FIG. 4 provides tabular illustrations of configuring a chameleon avatar appearance attribute according to the present invention, and more particularly of setting a height of the chameleon avatar. As illustrated in table 402, setting the chameleon height comprises determining the target/customer avatar height value, with the present example value 6.2 corresponding to 6 and 2/10 feet in height as perceived in the virtual universe domain. The chameleon avatar may have its height set equivalent to the height of the target avatar. Alternatively, as illustrated in tables 402 and 404, a range variation rule may be applied, wherein in the present example a delta of up to 0.5 may be added or subtracted, resulting in a possible range of chameleon avatar heights between 5.7 and 6.7. Further, randomness is introduced in the selection of the height value by providing for a random delta value generation within the permissible range variation, and more particularly providing for a subset range within the larger permissible range variation of a possible random delta value between negative-0.4 through positive-0.4, and a random delta value of negative-0.3 is selected in the present example.

The chameleon height delta may be further configured in response to historic target avatar data, in the present example through observing in previous experiences with the same target avatar that the target avatar prefers taller avatars, and accordingly the delta value is modified to a positive-0.3 value in order to ensure that application of the delta will result in the chameleon avatar height being set taller than the target avatar height, as the initial chameleon avatar height value was set to the target avatar height value of 6.2.

The magnitude and direction of an applied delta may also be context sensitive. Thus, in the present example, the context of the engagement with the target avatar is identified as a negotiation situation. In a negotiation, it may be preferable to increase an avatar's size in order to amplify a perceived position of strength in the negotiation and, in some cases, to intimidate the other party. Accordingly, in the present example, an additional positive value of 0.1 is added to the delta in order to further increase the height of the chameleon avatar. Other contexts may indicate a decrease in chameleon avatar height or size by providing a negative value adjustment to the delta, for example in an apologetic context situation or in order to provide a gentler or submissive appearance.

Table 404 illustrates application of the delta modifications determined in table 402. More particularly, the initial chameleon avatar height value set equivalent to the height of the target avatar (6.2) is revised through application of a delta (0.3), set through generating a random delta value (−0.3) within a permissible range variation of plus/minus 0.5, and further wherein the value of the randomly generated delta is set to positive in order to ensure that the adjustment of the height will increase the height of the chameleon avatar over the height of the target avatar. An additional context situation adjustment value of 0.1 is added to the delta as a function of recognizing that the target avatar engagement is a negotiation situation, and the final value is validated against the permissible height range variation of from 5.7 to 6.7 rule, resulting in application of the resultant delta to produce a chameleon avatar height value of 6.6.

Figure 5:
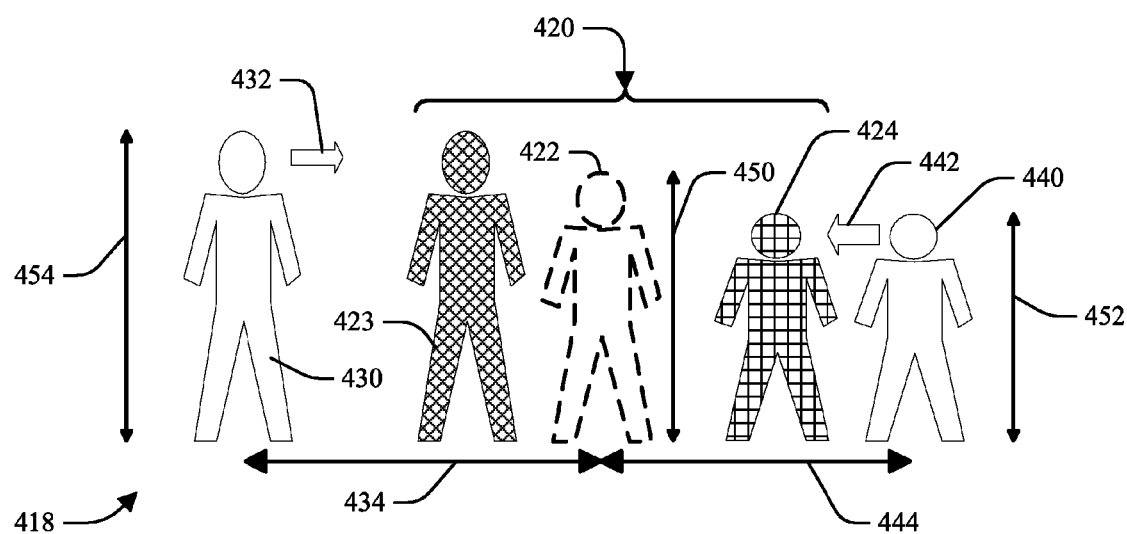
FIG. 5 is a block diagram illustration of rendering a chameleon avatar to a target avatar according to the present invention.

With respect to engaging or dealing with multiple avatars, some embodiments set chameleon avatar appearance attributes and other characteristics through using rules-based approaches for adjusting to one or all of the other plurality of avatars. More particularly, if auto-morphing is on and a chameleon avatar is engaging multiple target avatars/people at the same time within the predefined proximity, there may be a conflict in auto-morphing configurations appropriate to different individual target avatars. FIG. 5 provides an illustration of a rendering of a chameleon avatar 420 according to the present invention within a virtual universe 418 to a first target avatar 430 and a second target avatar 440. In the present example, the first target avatar 430 may be wearing party clothes and speaking perfect English, while the second target avatar 440 is wearing formal business clothes and doesn't speak much English. Accordingly, a preferred chameleon avatar attire and language/slang configuration 423 selected for a presentment 432 to the first target avatar 430 conflicts with, and is mutually exclusive from, a preferred chameleon avatar attire and language/slang configuration 424 selected for a presentment 442 to the second target avatar 440.

In some embodiments, the conflict may be resolved by a proximity-priority rule. For example, referring to FIG. 5 the chameleon configuration 423 configured for the first target avatar 430 may be chosen for presentment to both of the first target avatar 430 and the second target avatar 440 in response to a closer proximity 444 of the first target avatar 430 to the chameleon avatar 420 relative to a proximity 434 of the second target avatar 440.

Chameleon avatar attributes may also be set as a function of a plurality of sometimes divergent observations and attributes associated with a group of target avatars. Thus, in another example, referring again to FIG. 5, the chameleon avatar 420 may be configured into a combination configuration 422 in response to attributes read from both the first target avatar 430 and the second target avatar 440. Thus, the combination chameleon 422 may be set with a height value 450 set as a function of the observed/read shorter height attribute 452 of the first target avatar 430 and the observed/read taller height attribute 454 of the second target avatar 440, for example, as a mean of the height values 452/454, though other functions may be utilized, and further increased or decreased in response to context information as discussed elsewhere in this application (e.g. shortened to encourage trust and reduce apprehension by group members, or increased to enhance influence over group members).

If there is a conflict or divergence in attire among the group of target avatars, a conservative rule may determine that the chameleon avatar attire is set to match the most conservative or business-like dresser within the target group; or a trendsetting rule may cause adoption of the most stylish or extreme attire presented within the group. Similarly, the gender of the chameleon avatar may be set to match the gender of a particular subset of the target group (e.g. of the majority, or of the majority of leaders or important persons within the group, or of the gender having the highest frequency of occurrence historically within the group). Location contexts may also be used to determine chameleon avatar settings. For example, if the location of the engagement with a plurality of target/customer avatars is a jewelry store, data may indicate that female chameleon avatars have better success rates with respect to selling jewelry and thus the chameleon gender configuration may default to female, wherein the opposite may be true with respect to a fishing store location resulting in a male gender selection.

Relative vocabulary levels may be determined for each of a group of target avatars. In some examples, the chameleon avatar is responsively configured to match the most educated customer vocabulary level, wherein in other examples the community avatar may be configured to match the least-educated or lowest common denominator level where it is preferred that none of the group should be intimidated or made to feel uncomfortable. Similar determinations may be made with respect to individual variations in weight and body mass, for example, calculating the body mass index (BMI) of the chameleon avatar as a function of an observed weight to height ratio of one or more of a group of target avatars, in some embodiments choosing the largest or the smallest or the mean/average BMI of the target group. Skin or hair color of the chameleon avatar may be selected to match one or more of the target group avatars, in some examples selected to match (or within a delta of a match of) the average skin or hair color of a majority of the group.

Criteria may also be applied to select target/customer avatars within a group for preferential chameleon configuration. It may be desirable for the chameleon avatar to resemble specific avatars that are outside his general proximity during a target group encounter, and accordingly the present invention provides processes and methods for sorting out target avatars through application of specified criteria for transformation characteristics. For example, in order to enhance marketing to a target group of avatars, it may be desirable for the chameleon avatar to mimic an avatar or otherwise optimize his/her configuration to enhance interactions as indicated by avatars not present but having previous successful engagements with members of the group, or mimicking former influential or leading members of the group.

Accordingly, in one embodiment, a chameleon avatar configuration process or system is configured to traverse and sort a target group listing, select a subset of most important or influential avatars (for example, the five avatars with the most friends and chat sessions per day within the group), blend the looks and other appearance attributes into an amalgam, in some embodiments by selecting the looks of the most popular avatar of the top five as a base template and then forming the amalgam therefrom, and further in some embodiments by adding/subtracting deltas determined from characteristics of a next most-popular group of the target avatars. In one aspect, configuring the chameleon avatar responsive to multiple attributes of some or all members of a group may result in an avatar that is unique; as it will not mimic any one of the group of avatars, it is not likely to be recognizable as a twin or clone of anyone of the group. Furthermore, although unique in overall appearance, the chameleon avatar will also possess or display many attributes deemed positive or important by the group as indicated by the relative high-ranking of the avatars within the group that possess these attributes. Accordingly, such a unique resultant chameleon avatar may be expected to fit in well with the target group.

Chameleon characteristics may also be selected and acquired by looking outside of target avatars and target avatar groups for attributes demonstrably successful widely or universally, for example within a given VU domain. Thus, the most popular avatars in a VU (e.g., the ones with the most friends, the most chats, etc.), or the most beautiful, the most notorious, and/or the most successful (those having the most items in their inventory, who have generated the most revenue for their VU business, etc) may be identified and the chameleon avatar configured to mimic one or more of their attributes, or to incorporate or display the attributes with deltas, as discussed above.

II. Computerized Implementation

The present invention may be implemented using conventional software tools and methods applicable to virtual universes, for example within a stand-alone VU application, or as a plug-in to an existing VU application. The system and mechanisms described could be implemented in a hosting system or grid for a virtual universe or in client software for the virtual universe installed on a user's personal computer or other programmable device. Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the present invention, including the methods, processes and devices/systems illustrated in the Figures and described herein, including the engagement determiner component 202, the attribute analyzer component 204, and the morpher/rendering engine component 206, which are stored in memory 316 and/or storage system 332. It is to be appreciated that two or more, including all, of the components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware. To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. Moreover, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to practice an embodiment according to the present invention, including the methods, processes and devices/systems illustrated in the Figures and described herein. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation could be deployed, managed, serviced, etc. by a service provider who offers to implement, deploy, and/or perform the functions of the present invention, including methods, processes and devices/systems according to the present invention as illustrated in the Figures and described herein, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for configuring a chameleon avatar in response to data associated with a target avatar within a virtual universe, the method comprising:
    determining that an engagement of a chameleon avatar with a target avatar within a region of a virtual universe is indicated, wherein the chameleon avatar presents one or more initial gender, ethnic, body dimension and clothing attire appearances to other avatars within the virtual universe;
    determining whether any of the initial chameleon avatar gender, ethnic, body dimension or clothing attire appearances should be changed for the indicated engagement with the target avatar within the indicated virtual universe region;
    if determined that one of the initial chameleon avatar gender, ethnic, body dimension or clothing attire appearances should be changed for the indicated engagement with the target avatar within the indicated virtual universe region, reading an attribute from metadata associated with the target avatar or the indicated virtual universe region and changing the one of the initial gender, ethnic, body dimension and clothing attire appearances as a function of the read attribute; and
    the chameleon avatar engaging the target avatar within the indicated virtual universe region in the initial gender, ethnic, body dimension or clothing attire appearances if determined that none of the appearances should be changed, or in the changed ones of the initial gender, ethnic, body dimension and clothing attire appearances if determined that the at least one of the initial gender, ethnic, body dimension and clothing attire appearances should be changed.

2. The method of claim 1, further comprising identifying a group of avatars associated with the target avatar; and
    forming the changed gender, ethnic, body dimension or clothing attire appearance as an amalgam of the gender, ethnic, body dimension or clothing attire appearances of each of the plurality of the group of avatars.

3. The method of claim 1, wherein the reading the attribute from the metadata associated with the target avatar or the indicated virtual universe region comprises reading a gender attribute, an interest attribute, an outfit attribute, an ethnic data attribute, a language-used attribute, a likes attribute or a preferences attribute of the target avatar.

4. The method of claim 3, wherein the step of changing the at least one chameleon avatar initial gender, ethnic, body dimension or clothing attire appearance as a function of the read attribute comprises mimicking a gender, a body dimension, a style of clothing, a hair style, a skin color, a language accent, a language slang expression, or an ethnic appearance of the target avatar.

5. The method of claim 4, wherein the step of changing the at least one of the initial gender, ethnic, body dimension or clothing attire appearance further comprises:
adding a delta value to a value of the read attribute to generate a delta-revised read attribute value; and
changing the at least one gender, ethnic, body dimension or clothing attire appearance to an appearance that is different from a corresponding appearance of the target avatar as a function of the delta-revised read attribute value.

6. The method of claim 5, wherein the changing the at least one gender, ethnic, body dimension or clothing attire appearance to an appearance that is different from the corresponding appearance of the target avatar as a function of the delta-revised read attribute value comprises at least one of:
changing the gender appearance of the chameleon avatar to one opposite to a gender of the target avatar; and
changing a height of the chameleon avatar to a height greater than or less than a height of the target avatar.

7. The method of claim 5, further comprising randomly setting the delta value.

8. The method of claim 7, further comprising:
defining a list of target avatars for the chameleon avatar;
detecting a proximity of an avatar within a defined proximity of the chameleon avatar; and
determining that the engagement of the chameleon avatar with the target avatar within the region of a virtual universe is indicated if the avatar detected within the defined proximity matches a listed avatar.

9. The method of claim 8 further comprising:
defining a plurality of engagement contexts within the virtual universe for which automatically changing the at least one of the gender, ethnic, body dimension or clothing attire appearances of the chameleon is triggered;
detecting an engagement context of the indicated virtual universe region; and
automatically changing the at least one of the gender, ethnic, body dimension or clothing attire appearances of the chameleon avatar if the detected engagement context of the indicated virtual universe region matches a one of the predefined plurality of engagement contexts.

10. The method of claim 9, wherein the plurality of engagement contexts comprises a business attire context and a social context, and the automatically changing the at least one of the gender, ethnic, body dimension or clothing attire appearances of the chameleon avatar comprises:
changing the clothing attire appearance of the chameleon avatar to a business attire if the detected engagement context of the indicated virtual universe region matches a business attire context of the predefined plurality of engagement contexts; and
changing the clothing attire appearance of the chameleon avatar to a casual attire if the detected engagement context of the indicated virtual universe region matches a social attire context of the predefined plurality of engagement contexts.

11. The method of claim 10, wherein the attribute read from metadata associated with the target avatar indicates that the target avatar is wearing a business suit, the method further comprising:
changing the clothing attire appearance of the chameleon avatar to a business casual attire if the detected engagement context of the indicated virtual universe region matches the social attire context of the predefined plurality of engagement contexts; and
changing the clothing attire appearance of the chameleon avatar to a business suit if the detected engagement context of the indicated virtual universe region matches the business attire context of the predefined plurality of engagement contexts.

12. The method of claim 11, further comprising:
associating an auto-morph on indicator or an auto-morph off indicator with each of the plurality of engagement contexts and the at least one listed target avatar; and
changing the at least one gender, ethnic, body dimension or clothing attire appearance of the chameleon avatar in response to an association of the auto-morph on indicator with an at least one listed target avatar matching the target avatar detected within the defined proximity and a one of the predefined plurality of engagement contexts matching a current context.

13. The method of claim 12, further comprising:
defining a proximity threshold for the determining whether the chameleon avatar should be auto-morphed for engagement; and
determining the chameleon avatar should be auto-morphed in response to a location of the target avatar within the proximity threshold.

14. The method of claim 13, wherein the target avatar is a first target avatar and the read attribute is a first read attribute, further comprising:
determining that an engagement of the chameleon avatar with a second target avatar is indicated;
reading a second appearance attribute from metadata associated with the second target avatar, wherein auto-morphing the baseline template to incorporate the second read attribute produces an auto-morphed avatar appearance conflicting with a auto-morphed avatar appearance generated by auto-morphing the baseline template in response to the first read attribute; and
resolving the conflict by selecting the first read attribute over the second read attribute as a function of preferring the first target avatar over the second target avatar, and auto-morphing the baseline template to incorporate the selected attribute.

15. The method of claim 14, comprising preferring the first target avatar over the second target avatar as a function of at least one of:
a closer proximity of the first target avatar to the chameleon avatar relative to a proximity of the second target avatar to the chameleon avatar; and
a higher status of the first target avatar relative to a status of the second target avatar.

16. A service for configuring a chameleon avatar within a virtual universe in response to data associated with a target avatar, comprising:
deploying an engagement determiner within a virtual universe that determines whether an engagement of the chameleon avatar with a target avatar within a region of the virtual universe is indicated, the chameleon avatar having one or more initial gender, ethnic, body dimension and clothing attire appearances, and determines whether any of the initial chameleon avatar gender, ethnic, body dimension and clothing attire appearances should be changed for the indicated engagement with the target avatar within the indicated virtual universe region;
deploying an avatar attribute analyzer within the virtual universe that reads an attribute from metadata associated with the target avatar or the indicated virtual universe region if the engagement determiner determines that at least one of the initial chameleon avatar gender, ethnic, body dimension and clothing attire appearances should be changed for the indicated engagement; and deploying an avatar morpher within the virtual universe that changes at least one of the initial gender, ethnic, body dimension and clothing attire appearances for the indicated engagement with the target avatar as a function of the read attribute if the engagement determiner determines that at least one of the initial chameleon avatar gender, ethnic, body dimension and clothing attire appearances should be changed.

17. The service of claim 16, wherein the avatar attribute analyzer reads a gender attribute, an interest attribute, an outfit attribute, an ethnic data attribute, a language-used attribute, a likes attribute or a preferences attribute of the target avatar; and wherein the avatar morpher adds a delta value to a value of the read attribute to generate a delta-revised read attribute value; and changes the at least one gender, ethnic, body dimension or clothing attire appearance to an appearance that is different from a corresponding appearance of the target avatar as a function of the delta-revised read attribute value.

18. The service of claim 17, wherein avatar morpher causes an appearance of a one of the chameleon avatar gender, ethnic, body dimension or clothing attire appearances to mimic an appearance of the target avatar associated with the read attribute, comprising: a gender, a body dimension, a style of clothing, a hair style, a skin color, a language accent, a language slang expression, and an ethnic appearance.

19. The service of claim 18 wherein the avatar attribute analyzer further determines a business or social context of the indicated engagement region of the virtual universe; and the avatar morpher changes the clothing attire appearance of the chameleon avatar to a business casual attire to engage the target avatar if the avatar attribute analyzer determines the social context for the indicated engagement region, and to a business suit attire to engage the target avatar if the avatar attribute analyzer determines the business context for the indicated engagement region.

20. An article of manufacture comprising:
a computer-readable tangible storage device having computer-readable program code embodied therewith, the program code comprising instructions that, when executed by a computer system, cause the computer system to:

determine that an engagement of a chameleon avatar with a target avatar within a region of a virtual universe is indicated, the chameleon avatar presenting one or more initial gender, ethnic, body dimension and clothing attire appearances to other avatars within the virtual universe;

determine whether any of the initial chameleon avatar gender, ethnic, body dimension and clothing attire appearances should be changed for the indicated engagement with the target avatar within the indicated virtual universe region; and if determined that at least one of the initial chameleon avatar gender, ethnic, body dimension and clothing attire appearances should be changed for the indicated engagement with the target avatar within the indicated virtual universe region, read an attribute from metadata associated with the target avatar or the indicated virtual universe region and change at least one of the initial gender, ethnic, body dimension and clothing attire appearances as a function of the read attribute; and cause the chameleon avatar to engage the target avatar in the initial gender, ethnic, body dimension and clothing attire appearances if determined that none of the appearances should be changed, or in the changed ones of the initial gender, ethnic, body dimension and clothing attire appearances if determined that the at least one of the initial gender, ethnic, body dimension and clothing attire appearances should be changed.

21. The article of manufacture of claim 20, wherein the read attribute is a gender attribute, an interest attribute, an outfit attribute, an ethnic data attribute, a language-used attribute, a likes attribute or a preferences attribute of the target avatar, the program code comprising instructions which, when executed on the computer system, further causing the computer system to:

add a delta value to a value of the read attribute to generate a delta-revised read attribute value; and change the at least one gender, ethnic, body dimension or clothing attire appearance to an appearance that is different from a corresponding appearance of the target avatar as a function of the delta-revised read attribute value.

22. The article of manufacture of claim 21, the program code comprising instructions which, when executed on the computer system, further causing the computer system to:

determine a context of the indicated engagement as a social context or a business context;

change the clothing attire appearance of the chameleon avatar to a business suit if the determined engagement context is the business context; and change the clothing attire appearance of the chameleon avatar to a casual attire if the determined engagement context is the social context.

23. A programmable device comprising:
a processing means;
a computer-readable memory in communication with the processing means; and
a computer-readable storage medium;
wherein the processing means, when executing program instructions stored on the computer-readable storage medium via the computer readable memory configures a chameleon avatar within a virtual universe by:

determining that an engagement of the chameleon avatar with a target avatar within a region of the virtual universe is indicated, the chameleon avatar presenting one or more initial gender, ethnic, body dimension and clothing attire appearances to other avatars within the virtual universe;

determining whether any of the presented initial chameleon avatar gender, ethnic, body dimension and clothing attire appearances should be changed for the indicated engagement with the target avatar within the indicated virtual universe region;

if determined that at least one of the initial chameleon avatar gender, ethnic, body dimension and clothing attire appearances should be changed for the indicated engagement, reading an attribute from metadata associated with the target avatar or the indicated virtual universe region and changing at least one of the initial gender, ethnic, body dimension and clothing attire appearances as a function of the read attribute; and causing the chameleon avatar to engage the target avatar in the initial gender, ethnic, body dimension and clothing attire appearances if determined that none of the appearances should be changed, or in the changed ones of the initial gender, ethnic, body dimension and clothing attire appearances if determined that the at least one of the initial gender, ethnic, body dimension and clothing attire appearances should be changed.

24. The programmable device of claim 23, wherein the processing means is further configured to:
- detect a current context of the indicated engagement region of the virtual universe as a social context or a business context;
- change the clothing attire appearance of the chameleon avatar to a business suit if the detected engagement context is the business context; and
- change the clothing attire appearance of the chameleon avatar to a casual attire if the detected engagement context is the social context.

25. The programmable device of claim 24, wherein the processing means is configured to select the read attribute from a first target avatar over an attribute of a second target avatar as a function of at least one of:
- a closer proximity of the first target avatar to the chameleon avatar relative to a proximity of a second target avatar to the chameleon avatar; and
- a higher status of the first target avatar relative to a status of the second target avatar.

* * * * *